J. W. CAMPBELL.
HEATING SYSTEM FOR DRINKING FOUNTAINS.
APPLICATION FILED FEB. 19, 1915.
1,251,338.
Patented Dec. 25, 1917.
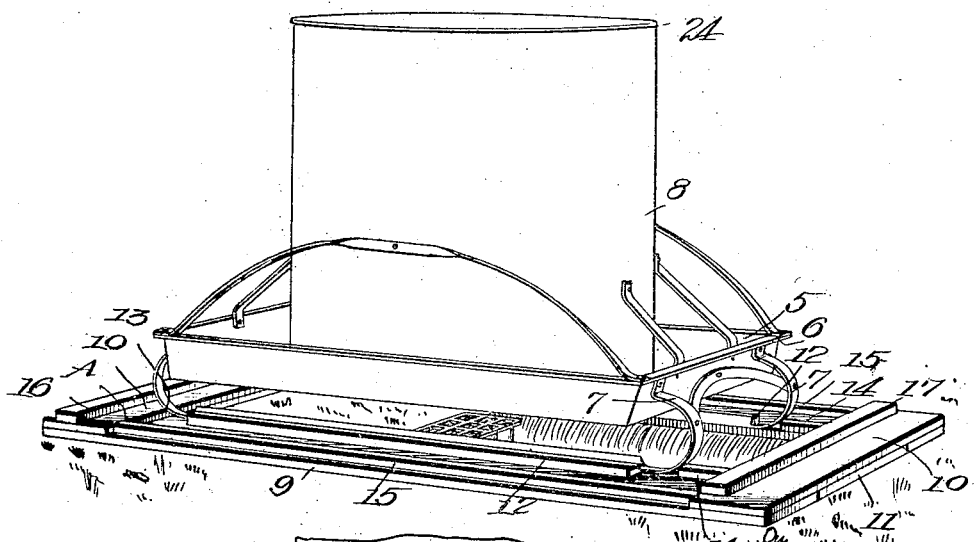
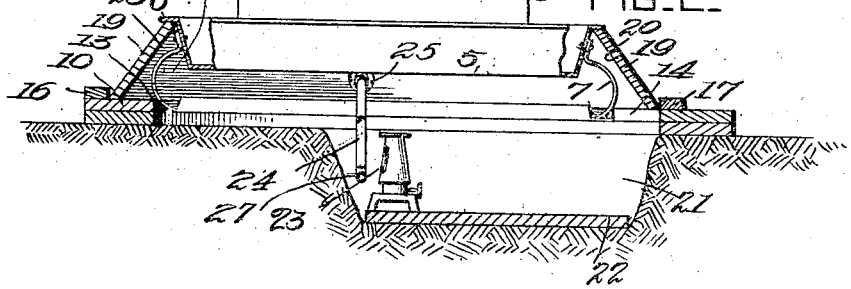
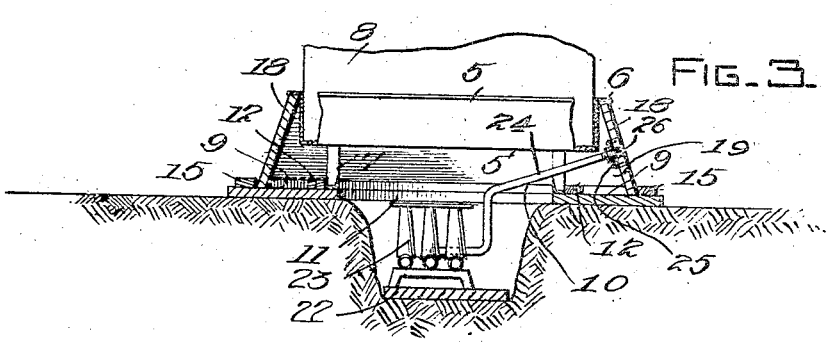
WITNESSES:
INVENTOR
John W. Campbell
BY Munn & Co.
ATTORNEYS

UNITED STATES PATENT OFFICE.

JOHN W. CAMPBELL, OF ADAMS, NEBRASKA.

HEATING SYSTEM FOR DRINKING-FOUNTAINS.

1,251,338.  Specification of Letters Patent.  Patented Dec. 25, 1917.

Application filed February 19, 1915. Serial No. 9,281.

*To all whom it may concern:*

Be it known that I, JOHN W. CAMPBELL, a citizen of the United States, and a resident of Adams, in the county of Gage and State of Nebraska, have invented an Improvement in Heating Systems for Drinking-Fountains, of which the following is a specification.

This invention relates to an improvement in drinking fountains for poultry, swine, cattle, and the like.

One of the principal objects of the invention is to provide a heating system particularly applicable to a well known type of fountain, whereby the water may be maintained at a desired temperature.

Another object of the invention is to provide an improved heating system, incorporating the use of a housing to be built up around the drinking pan of the fountain, for maintaining the heat around the pan, created by a lamp disposed beneath the same, in such manner that even during the coldest weather the water in the pan may be maintained above freezing temperature and at small expense.

A still further object of the invention is to provide a heating system of the type specified, which will be extremely simple, durable, efficient in operation, and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a perspective view of a fountain to which my heating system is particularly applicable, the fountain being shown as in position on the foundation or base utilized in the system.

Fig. 2 represents a view in section taken vertically and longitudinally through a system constructed according to my invention.

Fig. 3 represents a view in section and taken at right angles to Fig. 2.

The system is more particularly applicable to a fountain of certain structure, including, as indicated in Fig. 1, a rectangular drinking pan 5 having outwardly flared edges at 6, the pan being mounted upon a pair of runners indicated at 7. Disposed centrally within the pan and suitably braced in position, is a reservoir or tank indicated generally at 8, and including an outer casing or shell and an inner tank (see Fig. 3). From the reservoir the water is supplied to the drinking pan 5 and is automatically maintained at a predetermined level therein. The fowls or animals in using the device may drink from the pan at either end thereof.

In carrying out my invention I provide means whereby the pan is suitably housed on all sides, so that heat generated by a lamp disposed beneath the pan is accumulated around the latter so as to maintain the water at a temperature above freezing point.

My invention contemplates a platform or base or foundation indicated generally at A. The base comprises primarily, side boards 9 and end boards 10. The side boards are arranged in spaced and parallel relation, and are connected together at their ends by end boards 10 which are placed upon the side boards at the ends of the latter and are suitably connected or secured thereto. Beneath end boards 10 and between side boards 9 are secured the strips or fillers indicated at 11. The latter are of a thickness equal to the thickness of the side boards and are of a width equal to the width of the end boards.

Secured longitudinally of sides 9 and near the inner edges of the latter are longitudinal guide strips or supporting strips 12. In disposing the fountain in position on the foundation or base, the runners are placed between the guide strips 12 and in juxtaposition thereto, and rest upon the side boards 9 near the inner edges of the latter, as clearly shown in the drawing. At what may be termed the rear end of the base, the runners rest against the forward edge of the rear end board 10 as indicated clearly at 13. The length of the platform is such that the front end board 10 is disposed somewhat in spaced relation to the forward ends of the runners 7, and hence the latter do not contact with the forward or front end board, but they engage cleats indicated at 14 secured upon the side boards near the forward ends of the latter, as shown in Figs. 1 and 2. The coaction of guide strips 12, rear end board 10 and cleats 14, maintains the fountain against accidental displacement from the platform or base.

Side boards 9 near their outer edges are provided with longitudinally extending retainer strips 15, which are disposed in spaced relation to and parallel with strips 12. Rear end board 10 is provided near its rear edge with a longitudinally extending strip 16, and the front end board near its rear edge is provided with a longitudinally extending strip 17. The function of the retaining strips 15, 16 and 17, is to maintain in place against accidental removal, the sides and ends 18 and 19 respectively of the housing. These sides and ends are in the shape of boards which are adapted to engage at the lower edges against the base and at their upper edges against and beneath the edges 6 of the pan 5, so as to encompass or house the pan to retain the heat about the latter. The side boards 18 engage at the lower edges upon sides 9 of the base and rest against retaining strips 15, and at their upper edges engage beneath the side edge flanges 6 of the pan in the manner indicated. The ends of sides 18 are beveled as indicated at 20. The ends 19 of the housing engage at the lower edges against the cleats or strips 14 and 17 respectively, and at their upper edges engage beneath the end flanges 6 of the pan. The degree to which the ends of the sides are beveled, coincides with the degree of inclination of the ends 19, so that the latter snugly fit and engage upon the beveled ends of the sides, when in final position, as will readily be understood. The side walls 18 as shown in Fig. 3 are also inclined, and the end walls 19 of the housing are beveled to coincide with the inclination of the side walls 18.

In using the device I provide an excavation or hole in the ground indicated at 21, at the point I wish to place the fountain. I dispose the base or frame of the heating system about the opening so that the latter occurs, adjacent the forward end of the frame. Upon the bottom of this opening I preferably put a suitable board or lining indicated at 22, and upon the latter I deposit a suitable stove or heater indicated at 23. The heater may be in the form of an oil stove, or may be of any desirable or suitable type. The top of the heater preferably occurs substantially on a level with the plane of the foundation or base of the device.

In utilizing the apparatus I form the opening in the ground and arrange the foundation about the same as disclosed, and after having disposed the heater within the opening, I mount the fountain upon the base and place the sides and rear end of the housing in position. I then light the heater and adjust the same to the desired degree, and having disposed it substantially beneath the center of the fountain, I put the front end wall of the housing in place.

The housing retains the heat about the sides and bottom of the drinking pan, and maintains the water at a temperature above the freezing point, even in the coldest weather. The ground beneath and adjacent the fountain soon becomes warm, and as no appreciable amount of heat escapes from the heater, since the latter is vertically air-tight, but very little heat is necessary to keep the system warm. I have found that I can fill the reservoir or tank 8 with ice cold water and keep it warm for twenty-four hours with the temperature ten or twenty degrees below zero, using but a small amount of kerosene in the heater. The cost of kerosene is very small, so that the cost of maintaining the heating system is comparatively slight.

It may be that the heater at times will require more oxygen than will find its way through the joints and the corners of the housing. In order that this extra amount of oxygen may be supplied when wanted and without the danger of heat being lost, I have provided an air intake tube 24. At its outer end this tube is connected suitably with a socket 25 registering with a hole or opening 26 provided in one of the side boards of the housing. The tube passes inwardly between the floor of the pan and the adjacent runner and at its inner end is bent downwardly to project into the opening in the ground and is then bent outwardly so that the inner end 27 of the tube will be disposed adjacent the heater. Sufficient air for the heater may thus be provided through the tube, and without the danger of heat being lost from beneath the pan. The tube is disposed between the heater and the rear portion of the apparatus, so that the heater may be drawn forwardly in the opening to be filled or trimmed and lighted when required.

The reservoir or tank 8 comprises, as stated, an outer casing and an inner tank. An air space occurs between them, which space I convert into a dead air space by the utilization of a circular cover or closure indicated at 24, which I place upon the top of the outer casing so as to inclose the inner tank and the air space. Direct contact of air or wind with the inner water containing tank is thus prevented, so that further conservation of the heat is thus attained.

Although I have described the preferred embodiment of my invention, I may desire to make such changes in the construction, combination, and arrangement of parts thereof as do not depart from the spirit of the invention and the scope of the appended claims.

I claim:—

1. In a drinking fountain, the combination of a rectangular base comprising spaced end and longitudinal members, strips secured to the upper faces of the said members, a rectangular drinking pan having outwardly extending flanges at the top edges of its sides, means for supporting the drinking pan a distance above the base and coacting with certain strips thereof to center the pan and hold it in given position, and boards disposed along the ends and sides of the base and upwardly and inwardly inclined, with their upper edges engaging under the outer flanges of the drinking pan and their lower edges in contact with the base and certain strips thereof and having their ends abutting.

2. A drinking fountain to be placed upon the ground over an excavation therein containing a heater, such fountain comprising a rectangular base having an opening to register with the said excavation, end and side strips secured to the upper face of the base near the outer edges thereof, a rectangular drinking pan having flared sides and outer flanges at the upper edges of the sides supported on the base a distance thereabove and held in place by certain of the strips, boards arranged along the ends and sides of the base, with their lower edges in contact therewith and with certain of the said strips, and inclining upwardly and inwardly, with their top edges in contact with the lower faces of the said outer flanges of the drinking pan, the ends of the boards abutting, and an air tube connected with one of the said boards and extending into the excavation of the ground to supply air to the heater.

JOHN W. CAMPBELL.

Witnesses:
  F. B. Draper,
  M. H. Garrison.

Copies of this patent may be obtained for five cents each, by addressing the "Commissioner of Patents, Washington, D. C."